US007835999B2

(12) United States Patent
Block

(10) Patent No.: US 7,835,999 B2
(45) Date of Patent: Nov. 16, 2010

(54) RECOGNIZING INPUT GESTURES USING A MULTI-TOUCH INPUT DEVICE, CALCULATED GRAPHS, AND A NEURAL NETWORK WITH LINK WEIGHTS

(75) Inventor: Matthew Block, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 766 days.

(21) Appl. No.: 11/769,542

(22) Filed: Jun. 27, 2007

(65) Prior Publication Data
US 2009/0006292 A1 Jan. 1, 2009

(51) Int. Cl.
*G06E 1/00* (2006.01)
(52) U.S. Cl. .................... 706/15; 382/157
(58) Field of Classification Search ......... 382/155–161; 706/20, 15–45, 62; 345/156–173
See application file for complete search history.

(56) References Cited

U.S. PATENT DOCUMENTS

| 2004/0095311 | A1 | 5/2004 | Tarlton et al. | |
|---|---|---|---|---|
| 2004/0148577 | A1* | 7/2004 | Xu et al. | 715/530 |
| 2005/0025355 | A1* | 2/2005 | Simard et al. | 382/159 |
| 2007/0065003 | A1* | 3/2007 | Kellerman et al. | 382/159 |
| 2009/0043441 | A1* | 2/2009 | Breed | 701/29 |

FOREIGN PATENT DOCUMENTS

| KR | 1999-0046908 | 7/1999 |
|---|---|---|
| KR | 2000-0039192 | 7/2000 |
| WO | WO 02/071315 | 9/2002 |

OTHER PUBLICATIONS

Yanikoglu et al., Off-Line Cursive Handwriting Recognition Using Style Parameters, 1993, Dartmouth College, technical report PCS-TR93-192, pp. 1-21.*
Martin et al., Recognizing Hand-Printed Letter and Digits Using Backpropagation Learning, Neural Computation Book, MIT Press Cambridge, Mass.,3 (2 Summer), 1991, pp. 258-267.*
Phokharakul et al. Recognition of Handprinted Thai Characters Using the Cavity Features of Character Based on Neural Network,1998, IEEE 0-7803-5146-0/98, pp. 149-152.*
Pittman, Recognizing Handwritten Text, 1991, ACM 0-89791-383-3/91/0004/0271, pp. 271-275.*

\* cited by examiner

*Primary Examiner*—David R Vincent
(74) *Attorney, Agent, or Firm*—Workman Nydegger

(57) ABSTRACT

The present invention extends to methods, systems, and computer program products for recognizing input gestures. A neural network is trained using example inputs and back-propagation to recognize specified input patterns. Input gesture data is representative of movements in contact on a multi-touch input display surface relative to one or more axes over time. Example inputs used for training the neural network to recognize a specified input pattern can be created from sampling input gesture data for example input gestures known to represent the specified input pattern. Trained neural networks can subsequently be used to recognize input gestures that are similar to known input gestures as the specified input pattern corresponding to the known input gestures.

20 Claims, 8 Drawing Sheets

US 7,835,999 B2

RECOGNIZING INPUT GESTURES USING A MULTI-TOUCH INPUT DEVICE, CALCULATED GRAPHS, AND A NEURAL NETWORK WITH LINK WEIGHTS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

In many environments, a computer system typically includes a Central Processing Unit ("CPU"), system memory (e.g., Random Access Memory ("RAM"), some type of mass storage device (e.g., magnetic disk), input devices, and output devices. Input devices are used to accept user input to the computer system and relay that user input to the CPU. Output devices are used to present CPU output to the user. Thus, a user typically uses input devices to input data into a computer system, the input devices relay the input data to the CPU, the CPU processes the input data to generate corresponding output data (e.g., through system or application programs), the CPU sends the output data to the output devices, and the output devices present the output data.

Both input and output devices can include a combination of hardware (physical objects) and software (e.g., device drivers, user-interface controls) to implement their desired functionality. Specific to input devices, hardware devices, such as, for example, keyboards, mice, joysticks, etc., are used to receive input data. These or other hardware devices can be used to manipulate and navigate to user-interface controls (e.g., buttons, menus, etc) that have specified input functions. For example, a user can manipulate a mouse to move a cursor over a "print" button and click a mouse button to cause a document to print.

More recently, computer display devices have been configured to function both as an input device and a video output device. For example, computer display devices can be configured with touch surface mechanisms that facilitate the entry of input data through a display surface. Sensors (e.g., pressure sensors) embedded in the display surface can detect when objects (e.g., fingers) contact a particular location on the display surface. A computer system can then perform some action in response to detecting the contact. For example, in response to detecting contact between an object and a display surface at a location corresponding to user-interface control, a computer system can perform some action associated with the user-interface control.

Accordingly, input devices advantageously permit a user to meaningfully interact with a computer system. In many public and semi-public environments (e.g., libraries, restaurants, private clubs, airline courtesy rooms, etc.), computer systems (e.g., kiosks, table top computer systems, etc.) are made available to large numbers of users. Within these environments, it is often desirable to permit multiple users to use the same computer simultaneously to conserve space, computer system resources, etc. It is also often desirable to allow any simultaneous users to work collaboratively together or to work separately based on individual user needs or to work collaboratively together. For example, it may be desirable to allow multiple users to work collaboratively together on a presentation. On the other hand, it may also be desirable to allow a first user to browser the Internet, while a second user edits a word processing document.

Unfortunately, existing input device technologies have at least a few drawbacks when attempting to provide multi-user access (either collaboratively or individually) to the same computer system. For hardware devices, at least one device per user must typically be provided. For example, for multiple users to simultaneously perform different computing tasks, each user may require a separate keyboard and mouse. Thus, even though multiple computer systems are not utilized, there typically must be sufficient workspace to co-locate multiple sets of input devices per computer system.

For software, each instance of a user-interface control can consume a portion of a display surface. Further, multiple sets of user-interface controls must be displayed to provide corresponding multiple users with simultaneous computer access. Depending on the display area of the display surface, the number of presented sets of user-interface controls, and the number of supported users, existing display area can be crowded and potentially of limited use. Further, user-interface controls (e.g., a button) typically have a single (or "right-side up") orientation. Thus, when multiple users are working collaboratively, user-interface controls are properly oriented only for one of the multiple users. User-interface controls are also typically optimized for large finger sizes causing them to consume more display areas than may be needed for many users.

In some environments, motion based gesture recognition can be used in combination with a touch surface to receive input data. Software modules within a computer system can recognize motion based gestures made on the touch surface. For example, the software modules can track a user's finger(s) in constant contact with the touch surface as the user's finger(s) makes an arc, draws an outline, etc., such as, for example, to draw a character of text. When the user's finger(s) are no longer detected on the touch surface, the software modules can process the contact path to recognize a corresponding motion based gesture, such as, for example, as the letter 'a'. Motion based gestures can correspond to pre-determined input functions. Thus, when the software modules detect a motion based gesture, the corresponding input function (e.g., recognizing character) is performed in response to the motion based gesture. Accordingly, motion based gestures, at least to some extent, can alleviate the need for per user hardware input devices and can reduce the size of per user sets of user-interface controls.

However, recognition of motion based gestures is relatively complex. This is due at least in part to differences in how different users can draw different symbols (or characters). For example, when a first user and second user each draw the latter 'a', the drawings of the letter 'a' can have various differences. The differences may be so significant that a computer systems does not recognize one or both of the drawings as the letter 'a' when compared to control data for the letter 'a' Accordingly, attempting to uniformly recognize motion based gestures (e.g., symbols and characters) for multiple users can be difficult.

BRIEF SUMMARY

The present invention extends to methods, systems, and computer program products for recognizing input gestures. In some embodiments, a computer system is trained to recognize input gesture data entered at a multi-touch input display surface as a corresponding specified input pattern (e.g., a character of text). The computer system accesses input gesture data for at least one example of a specified input pattern. The input gesture data represents detected contact on the multi-touch input display surface over a period of time. The input gesture data includes first direction movement data and second direction movement data. The first direction movement data indicates the position of detected contact on the multi-touch input display surface relative to a first axis (e.g., an X axis) over the time period. The second direction movement data indicates the position of detected contact on the multi-touch input display surface relative to a second different axis (e.g., a Y axis) over the time period.

The computer system encodes the input gesture data into an input vector of real values. Each real value corresponds to a sample on the first or second axis. The computer system saves an indication that the real values contained in the input vector represent an example of the specified input pattern.

The computer system accesses a fully connected neural network. The neural network includes input nodes, hidden nodes, and output nodes. The input nodes are fully connected to the hidden nodes and the hidden nodes are fully connected to the output nodes.

The computer system creates a training set to supply to the neural network to train the neural network to recognize the specified input pattern. The training set includes at least the input vector and a corresponding output vector. The corresponding output vector indicates the desired output of the neural network that is to correspond to the specified input pattern. The computer system uses a back propagation algorithm to train the neural network to recognize the specified pattern of input. The neural network is trained by training the neural network to generate output node values approximating the corresponding output vector in response to receiving the input vector.

In other embodiments, a computer systems recognizing input gesture data entered at a multi-touch input display surface as a specified symbol. The computer system accesses input gesture data representing detected contact on the multi-touch input display surface over a period of time. The input gesture data includes at least first direction movement data and second direction movement data. The first direction movement data indicates the position of detected contact on a multi-touch input display surface relative to a first axis (e.g., an X axis) over the time period. The second direction movement data indicates the position of detected contact on the multi-touch input display surface relative to a second different axis (e.g., a Y axis) over the time period.

The computer system takes a plurality of samples of each of the first direction movement data and the second direction movement data at a plurality of designated intervals between the beginning of the time period and the end of the time period. The computer system submits the plurality of samples to a corresponding plurality of input nodes of a previously trained neural network. The neural network has previously trained link weights from the input nodes to a plurality of hidden nodes and has previously trained link weights from the plurality of hidden nodes to a plurality of output nodes. Each output node is assigned to a specified symbol such that an output node being activated to a specified threshold value is indicative of the neural network recognizing input gesture data as the specified symbol.

The neural network processes the plurality of samples based on the previously trained link weights to activate values at each of the plurality of output nodes. The computer system determines that the activated value at a corresponding output node assigned to the specified symbol is at least the specified threshold value. The computer system indicates that the specified symbol has been recognized from the input gesture data.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
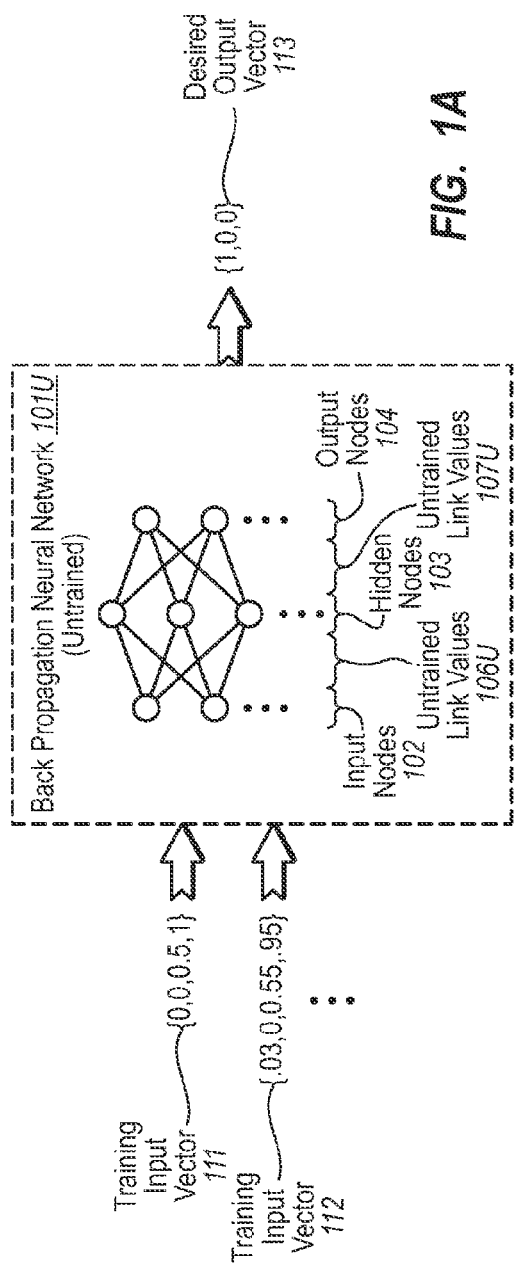
FIGS. 1A and 1B illustrate examples of an untrained neural network and corresponding trained neural network.

The present invention extends to methods, systems, and computer program products for recognizing input gestures. In some embodiments, a computer system is trained to recognize input gesture data entered at a multi-touch input display surface as a corresponding specified input pattern (e.g., a character of text). The computer system accesses input gesture data for at least one example of a specified input pattern. The input gesture data represents detected contact on the multi-touch input display surface over a period of time. The input gesture data includes first direction movement data and second direction movement data. The first direction movement data indicates the position of detected contact on the multi-touch input display surface relative to a first axis (e.g., an X axis) over the time period. The second direction movement data indicates the position of detected contact on the multi-touch input display surface relative to a second different axis (e.g., a Y axis) over the time period.

The computer system encodes the input gesture data into an input vector of real values. Each real value corresponds to a sample on the first or second axis. The computer system saves an indication that the real values contained in the input vector represent an example of the specified input pattern.

The computer system accesses a fully connected neural network. The neural network includes input nodes, hidden nodes, and output nodes. The input nodes are fully connected to the hidden nodes and the hidden nodes are fully connected to the output nodes.

The computer system creates a training set to supply to the neural network to train the neural network to recognize the specified input pattern. The training set includes at least the input vector and a corresponding output vector. The corresponding output vector indicates the desired output of the neural network that is to correspond to the specified input pattern. The computer system uses a back propagation algorithm to train the neural network to recognize the specified patterns of input. The neural network is trained by training the neural network to generate output node values approximating the corresponding output vector in response to receiving the input vector.

In other embodiments, a computer systems recognizing input gesture data entered at a multi-touch input display surface as a specified symbol. The computer system accesses input gesture data representing detected contact on the multi-touch input display surface over a period of time. The input gesture data includes at least first direction movement data and second direction movement data. The first direction movement data indicates the position of detected contact on a multi-touch input display surface relative to a first axis (e.g., an X axis) over the time period. The second direction movement data indicates the position of detected contact on the multi-touch input display surface relative to a second different axis (e.g., a Y axis) over the time period.

The computer system takes a plurality of samples of each of the first direction movement data and the second direction movement data at a plurality of designated intervals between the beginning of the time period and the end of the time period. The computer system submits the plurality of samples to a corresponding plurality of input nodes of a previously trained neural network. The neural network has previously trained link weights from the input nodes to a plurality of hidden nodes and has previously trained link weights from the plurality of hidden nodes to a plurality of output nodes. Each output node is assigned to a specified symbol such that an output node being activated to a specified threshold value is indicative of the neural network recognizing input gesture data as the specified symbol.

The neural network processes the plurality of samples based on the previously trained link weights to activate values at each of the plurality of output nodes. The computer system determines that the activated value at a corresponding output node assigned to the specified symbol is at least the specified threshold value. The computer system indicates that the specified symbol has been recognized from the input gesture data.

Within this specification and following claims, "backpropagation" is defined as learning technique used for training neural networks. Generally, backpropagation is used to train feed-forward networks (networks without feedback or looping connections). A training sample is provided to a neural network. The resulting output from the training sample is compared to a desired output for the training sample. For each node a local errors is calculated. The local error includes what the output of the node should have been to generate the desired output and a scaling factor indicating how much higher or lower the output of the node is to be to match the desired output. Link weights from each node are adjusted to lower the local error. "Blame" is assigned for local error to nodes at the previous level, giving responsibility to nodes connected by stronger weights. The steps are repeated at each level working back through the neural network until the input nodes are reached.

Thus, errors (and thus learning) propagate backwards from the output nodes to inner nodes. Accordingly, backpropagation is used to calculate the gradient of error of a neural network with respect to the neural network's modifiable (link) weights. Using backpropagation, link weights for generating a desired output can be iterated from an input sample that is to cause the neural network to generate the desired output.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

However, it should be understood, that upon reaching various computer system components program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example of untrained back propagation neural network 101U. Untrained back propagation neural network 101U includes input nodes 102, hidden nodes 103, and output nodes 104. Untrained link values 106U fully connect input nodes 102 to hidden nodes 103 (i.e., each input node is connected to every hidden node). Similarly, untrained link values 107U fully connect hidden nodes 103 to output nodes 104 (i.e., each hidden node is connected to every output node). Untrained link values 106U and 107U can be initialized to random values.

A plurality of input training vectors, such as, for example, training input vectors 111 and 112 can be provided to untrained back propagation neural network 101U. It can also be indicated that desired output vector 113 is the desired output the training input vectors are to generate. Input training vector 111 can be provided as input to untrained neural network 101U. In response to receiving training input vector 111, untrained link values 106U and 107U can be refined through backpropagation such that eventually the link values are trained to generate desired output vector 113 (or a set of values within some threshold thereof) for training input vector 111.

Subsequently, training vector 112 can input to untrained neural network 101U. In response to receiving training input vector 112, untrained link values 106U and 107U can be further refined through backpropagation such that eventually the link values are trained to generate desired output vector 113 (or a set of values within some threshold thereof) for training input vector 112.

Figure 1B:
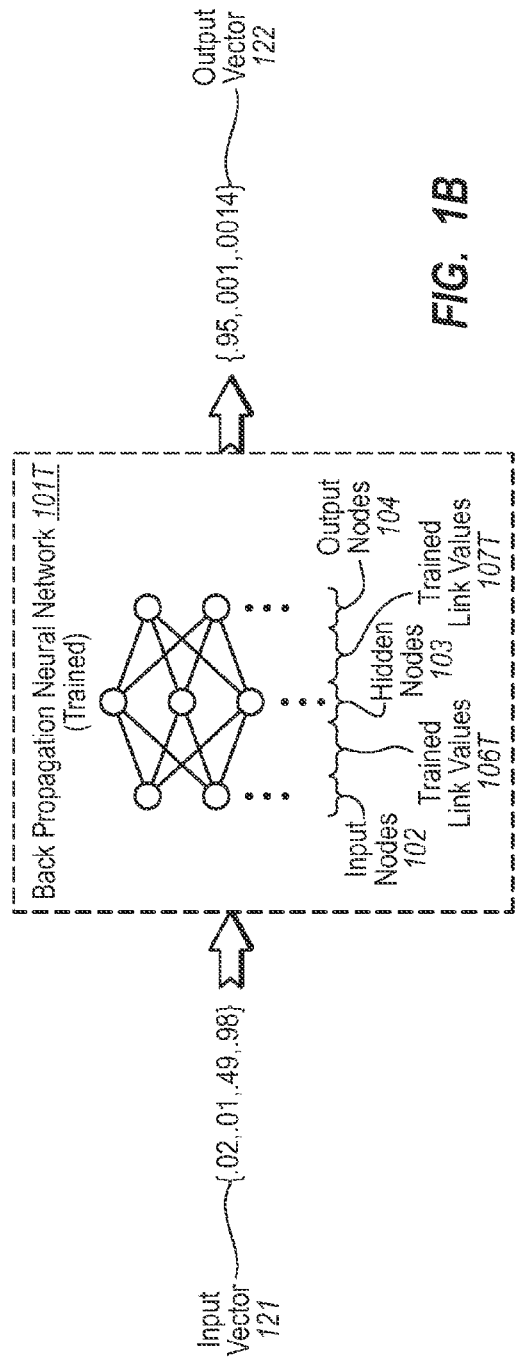

After training, any received input vectors similar to training input vectors 111, 112, etc., cause neural network 101 to output an output vector similar to (e.g., a set of values within some threshold of) desired output vector 113. For example, FIG. 1B depicts trained neural network 101T. Trained neural network 101T includes trained link values 106T and trained link values 107T trained through backpropagation. Input vector 121 can subsequently be provided as input to trained neural network 101T. Based on trained link values 106T and trained link values 107T, trained neural network 101T can generate output vector 122. The values within output vector 122 can be determined to be within a specified threshold of the values in desired output vector 113 such that the two output vectors are essentially identified as the same output.

Thus generally, through the use of one or more training inputs and a desired output, link values in a neural network can be trained to generate the desired output from the training inputs. Subsequently, when other similar inputs to the training inputs are provided to the neural network, the neural network will generate output similar to the desired output.

Figure 2A:
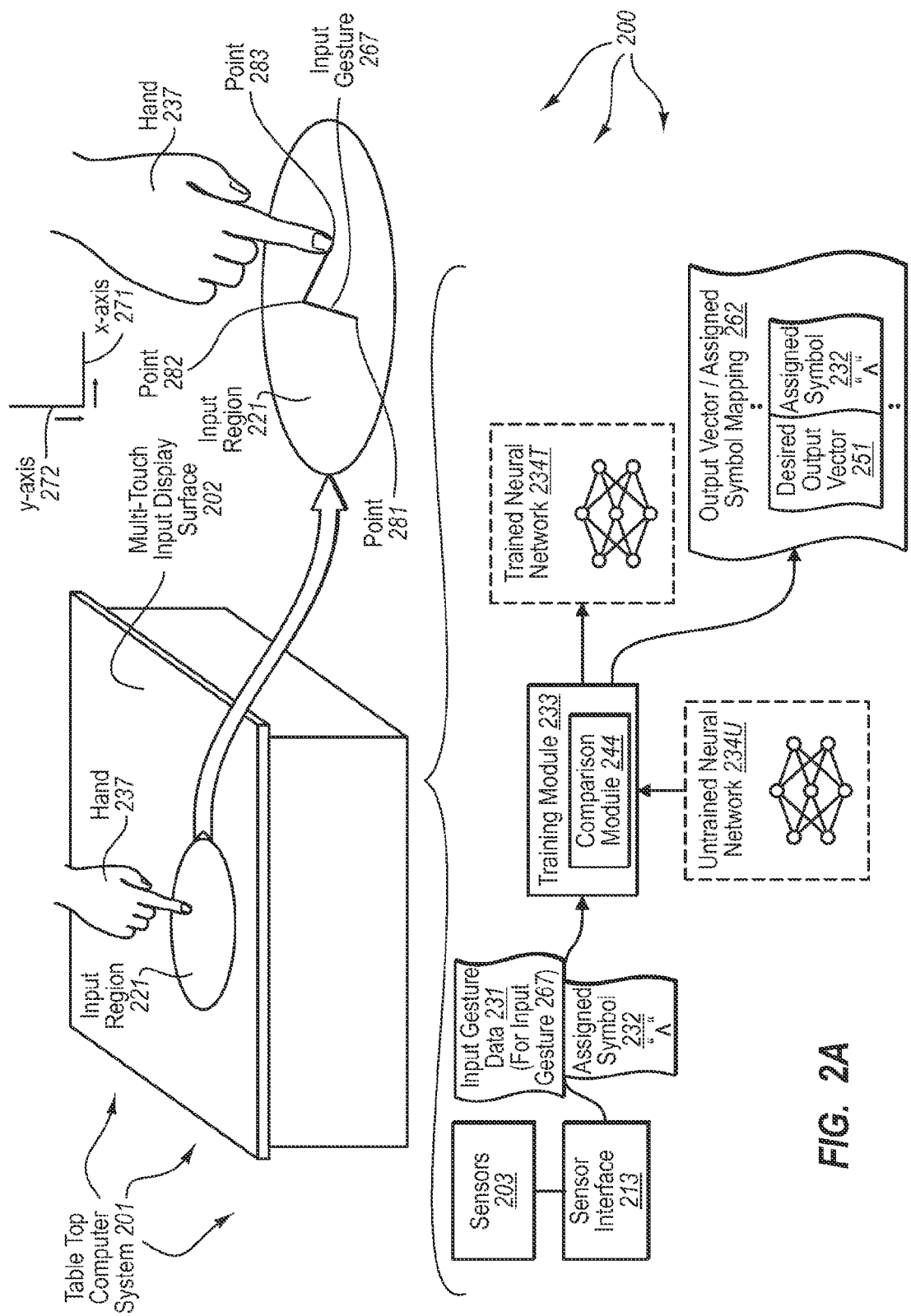
FIGS. 2A and 2D illustrate a computer architecture that facilitates recognizing input gestures.
Figure 2B:
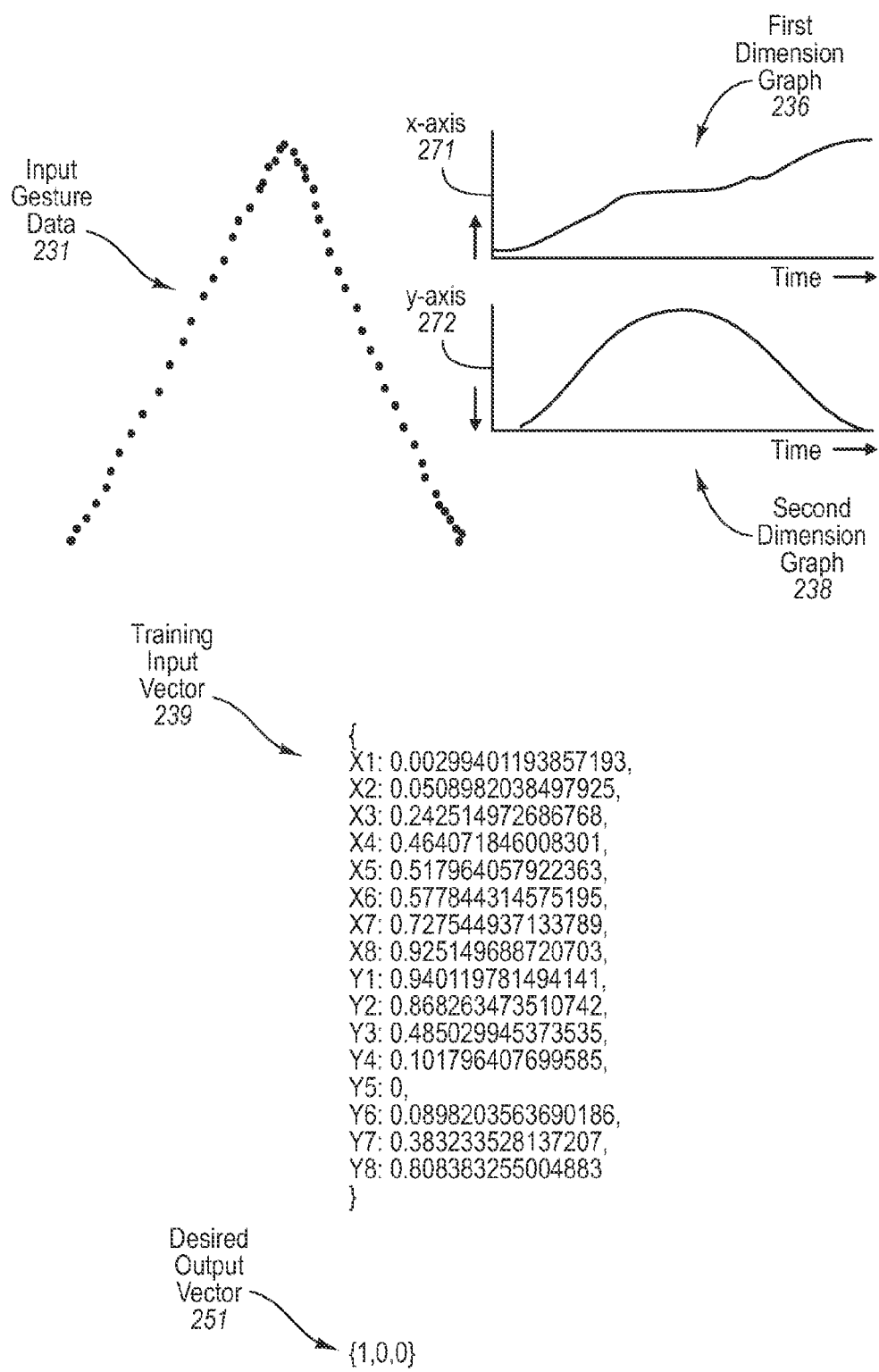
FIG. 2B illustrates an example of input gesture data, a corresponding training input vector, and a desired output vector.
Figure 2C:
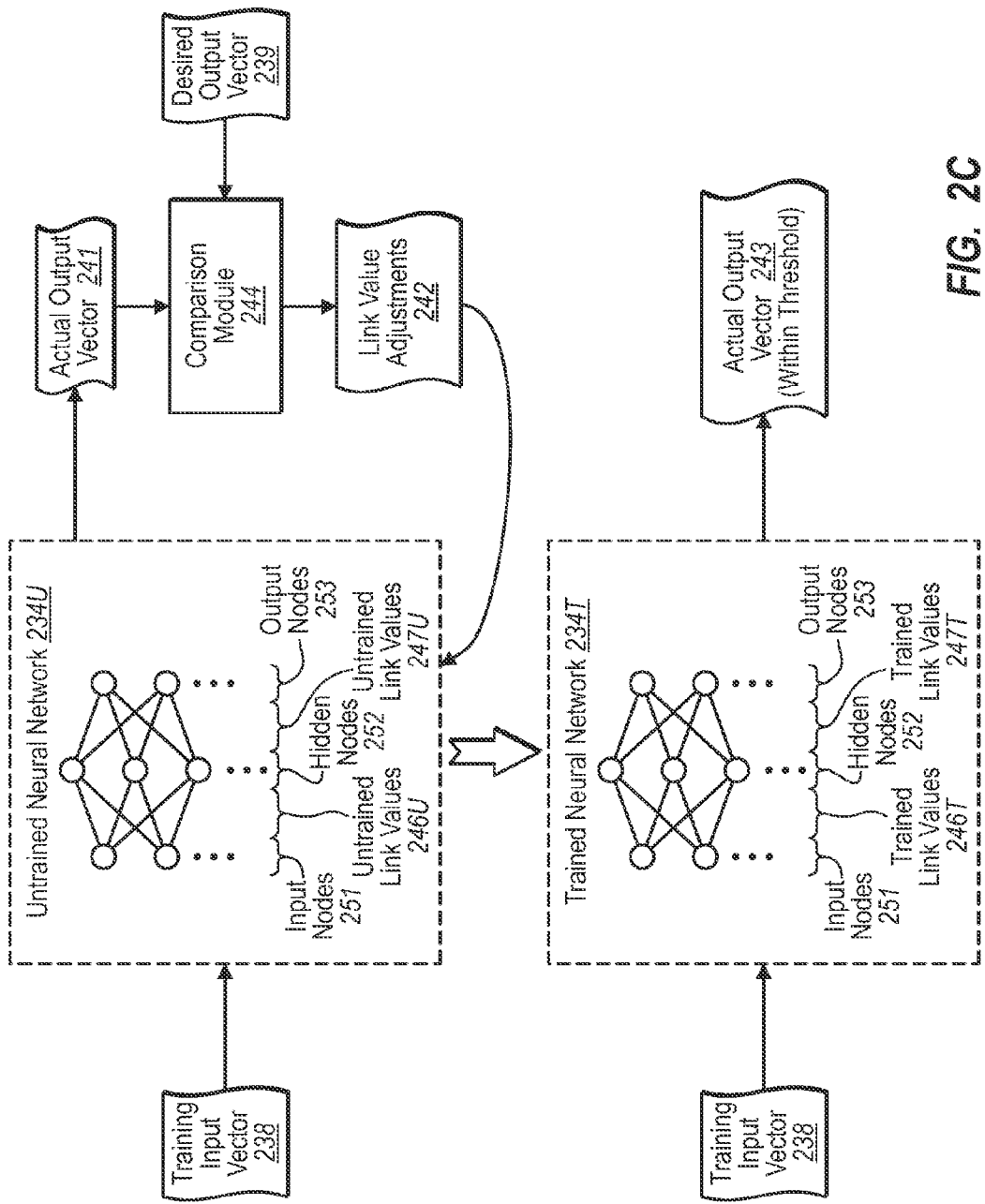
FIG. 2C illustrates an example of training a neural network to recognize an input gesture as a specified symbol.
Figure 2D:
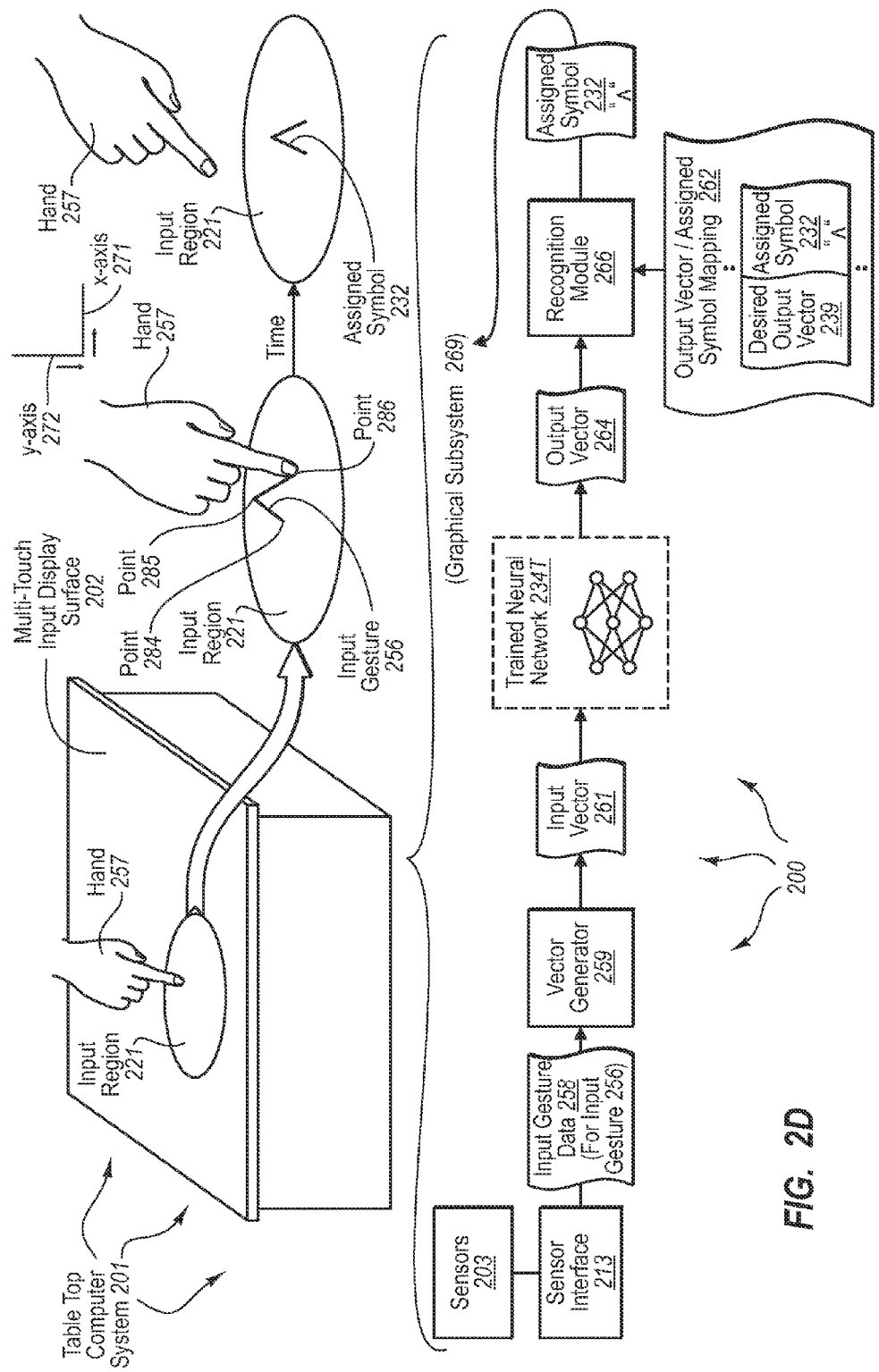

FIGS. 2A and 2D illustrate an example computer architecture 200 that facilitates replicating text at a virtual keyboard. Depicted in computer architecture 200 is table top computer system 201. Table top computer system 201 includes sensors 203, sensors interface 213, training module 233, vector generator 259, recognition module 266, and graphical subsystem 269. Generally, the components of computer architecture 200, including sensors 203, sensor interface 213, training module 233, vector generator 259, recognition module 266, and graphical subsystem 269, interoperate to implement various embodiments for recognizing input gestures.

Table top computer system 101 can be connected to a network, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network Sensors 203 can be configured to detect when a physical object (e.g., a bottle, a glass, a finger, a hat, etc.) has come into physical contact with a portion of the multi-touch input display surface 202. For example, sensors 203 can detect when a portion of hand 237 (or hand 257) has come in contact with multi-touch input display surface 202. Sensors 203 can be embedded in multi-touch input display surface 202 and can include for example, pressure sensors, temperature sensors, image scanners, barcode scanners, etc., that interoperate with sensor interface 213 to detect multiple simultaneous inputs.

In some embodiments, multi-touch input display surface 202 includes sensors for implementing a touch screen interface. For example, multi-touch input display surface 202 can include an interactive multi-touch surface. Thus, it may be that multi-touch input display surface 202 also functions as a presentation surface to display video output data to a user of table top computer system 201.

Sensors 203 can be included (e.g., embedded) in a plurality of locations across multi-touch input display surface 202. Sensors 203 can detect locations where physical contact with the multi-touch input display surface 202 has occurred. The density of sensors 203 can be sufficient such that contact across the entirety of touch input display surface 202 can be detected.

Sensors 203 can sample the entire surface of multi-touch input display surface 202 at specified intervals, such as, for example, 1 ms, 5 ms, etc. for detected contact. At each sampling interval, raw sensor data indicating the sampling results, including locations and/or area of any detected contact with multi-touch input surface 202, is sent to sensor interface 213. Thus, sensor output from sensors 203 can be raw sensor signal data indicating contact at a plurality of different locations and/or areas on multi-touch input display surface 202.

Sensor interface 213 can receive raw sensor signal data from sensors 203 and can convert the raw sensor signal data into input gesture data (e.g., digital data) that can be compatibly processed by other modules of table top computer system 201. Sensor interface 213 or the other modules can buffer contact input data as needed to determine changes in a selection region over time.

For example, raw sensor signal data from sensors 203 can change (e.g., between sampling intervals) as new contacts are detected, existing contacts are moved, and existing contacts are released on multi-touch input surface 202. Thus, upon receiving an indication of contact on multi-touch input display surface 202, sensor interface 213 can initiate buffering of raw sensor signal data (e.g., within a buffer in system memory of table top computer system 201). As contacts on multi-touch input display surface 202 change, sensor interface 213 can track the changes in raw sensor signal data and update locations and ordering of detected contacts within the buffer.

For example, sensor interface 213 can determine that contact was first detected at a first location and then contact was subsequently moved to other locations. Upon receiving an indication that contact is no longer detected anywhere on multi-touch input display surface 202, sensor interface 213 can convert the contents of the buffer to input gesture data. Sensor interface 213 then sends the input gesture data to other modules at table top computer system 201.

Training module 233 is configured to receive input gesture data and an assigned symbol. From received input gesture data, training module 233 can generate a training input vector for training a neural network to generate an output vector corresponding to the assigned symbol. Training module 233 can also maintain an output vector/assigned symbol mapping that maps output vectors to assigned symbols. Generally, training module 233 can train a neural network to recognize any number of different symbols, such as, for example, numbers, characters in an alphabet, and even user-generated symbols.

Figure 4:
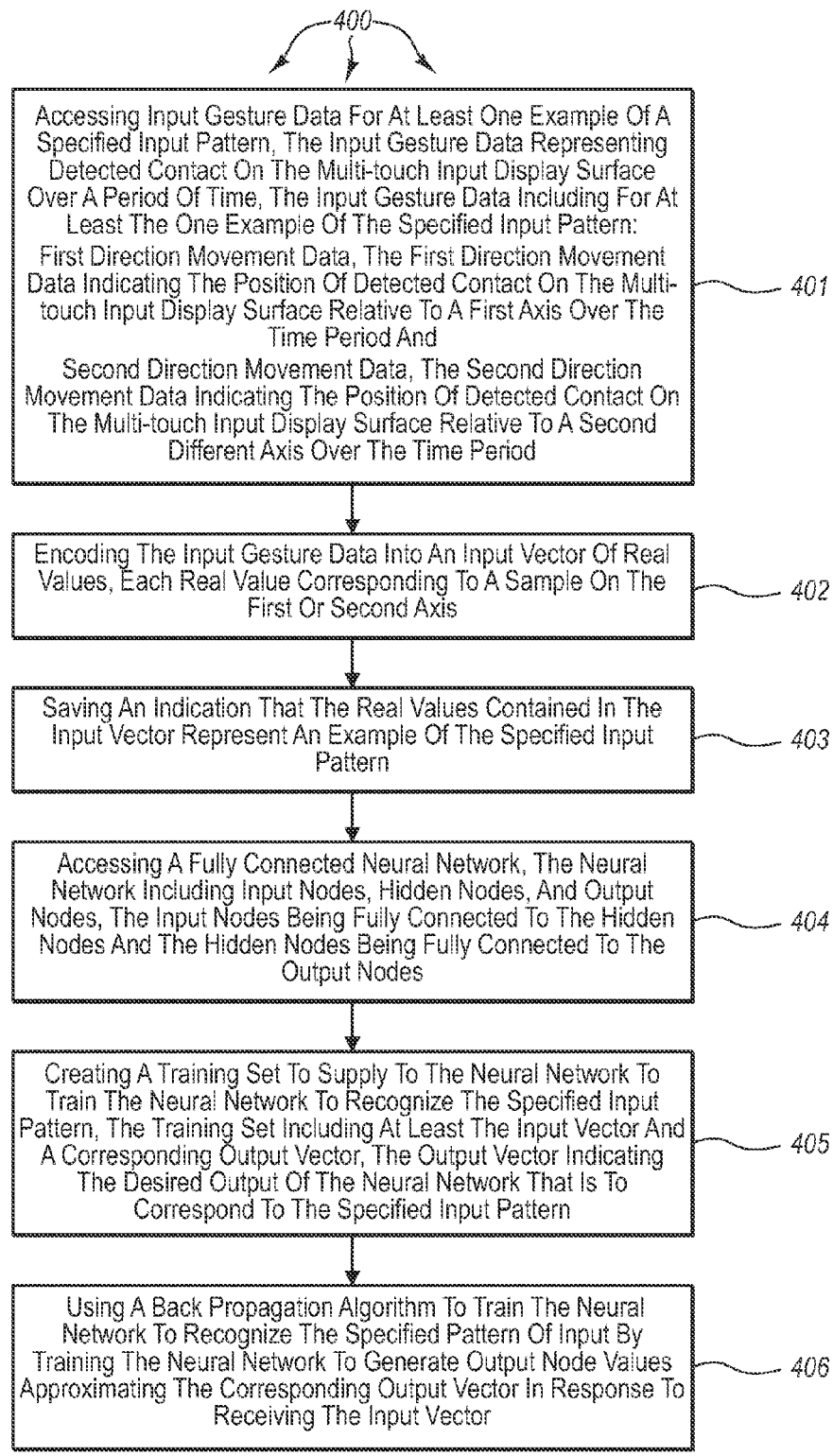
FIG. 4 illustrates a flow chart of an example method for training a computer system to recognize a specified input pattern.

FIG. 4 illustrates a flow chart of an example method 400 for training a computer system to recognize a specified input pattern. FIG. 2B illustrates an example of input gesture data, a corresponding training input vector, and a desired output vector. FIG. 2C illustrates an example of training a neural network to recognize an input gesture as a specified symbol. Method 400 will be described with respect to the components and data in FIGS. 2A, 2B, and 2C.

Method 400 includes an act of accessing input gesture data for at least one example of a specified input pattern, the input gesture data representing detected contact on a multi-touch input display surface over a period of time (act 401). The input gesture data including first direction movement data and second direction movement data for at least the one example of the specified input pattern. The first direction movement data indicates the position of detected contact on the multi-touch input display surface relative to a first axis over the time period. The second direction movement data indicates the position of detected contact on the multi-touch input display surface relative to a second different axis over the time period.

For example, it may be that the index finger of hand 237 contacts multi-touch input display surface 202 within input region 221 to enter input gesture 267. Sensors 103 can track contact (in an essentially straight line) from point 281 to point 282. Sensors 103 can then track contact (in essentially a straight line) from point 282 to point 283. As contact is moved from point to point on multi-touch surface 202, sensors 203 and sensor interface 213 can interoperate to track and buffer representative sensor signal data relative to X-axis 271 and Y-axis 272

After reaching point 283, the index finger of hand 237 can be lifted off of multi-touch input display surface 202. Accordingly, sensors 203 no longer detect contact on multi-touch input display surface 202. In response, sensor interface 213 can convert the representative sensor signal data to input gesture data 231. Input gesture data 231 represents detected contact over the period of time input gesture 267 was entered. Input gesture data 231 indicates the position of detected contact for input gesture 267 over the time period relative to X-axis 271 and Y-axis 272. Point 281 (the initial point of contact) can be used as the origin.

Sensor interface 213 can send input gesture data 231 to training module 233. Training module 233 can receive input gesture data 231 from sensor interface 213. Training module 233 can also receive assigned symbol 232. Assigned symbol 232 can be entered into table top computer system computer system 201 through a user-interface (e.g., of a recognition application). A user can designate that input gesture 267 (and thus also input gesture data 231) represents an example of assigned symbol 232.

Method 400 includes an act of encoding the input gesture data into an input vector of real values, each real value corresponding to a sample on the first or second axis (act 402). Referring to FIG. 2B, a graphical representation of input gesture data 231 is depicted. Based on the graphical representation, training module 233 can calculate first dimension graph 236. First dimension graph 236 indicates the location of detected contact of input gesture 267 relative to X-axis 271 over time. Based on the graphical representation, training module 233 can also calculate second dimension graph 238. Second dimension graph 238 indicates the location of detected contact of input gesture 267 relative to Y-axis 272 over time.

Training module 233 can sample the value of each of first dimension graph 236 and second dimension graph 238 at a plurality of designated times. From the sample values, training module 233 can encode training input vector 239 of real values. In the example in FIG. 2B, samples are taken at eight different times (within the period of time it took to enter input gesture 267). Values X1 through X8 represent sampled values from first dimension graph 236 and values Y1 through Y8 represent corresponding sampled values from second dimension graph 238. However, a fewer number or a greater number of sample times can be used. The combined number of samples (the product of the number of sampling times multiplied by the number of axes) can correspond to the number of input nodes of a neural network.

Method 400 includes an act of saving an indication that the real values contained in the input vector represent an example of the specified input pattern (act 403). For example, training module 233 can map assigned symbol 232 to desired output vector 251 and store the mapping in output vector/assigned symbol mapping 262. Training module can then save an indication that providing the real values of training input vector 239 as input to a neural network is to cause the neural network to output desired output vector 251.

Method 400 includes an act of accessing a fully connected neural network (act 404). The neural network includes input nodes, hidden nodes, and output nodes, the input nodes being fully connected to the hidden nodes and the hidden nodes being fully connected to the output nodes. For example, training module 233 can access untrained neural network 234U. Referring now to FIG. 2C, a more detailed view of untrained neural network 234U is depicted. Untrained links 246U fully connect input nodes 251 to hidden nodes 252 and untrained links 247U fully connect hidden nodes 252 to output nodes 253.

Method 400 includes an act of creating a training set to supply to the neural network to train the neural network to recognize the specified input pattern (act 405). The training set includes at least the input vector and a corresponding output vector, the corresponding output vector indicating the desired output of the neural network that is to correspond to the specified input pattern. For example, training module 233 can create a training set to supply to untrained neural network 234U to train untrained neural network 234U to recognize assigned symbol 232. The training set can include at least training input vector 239 and desired output vector 251.

Method 400 includes an act of using a back propagation algorithm to train the neural network to recognize the specified pattern of input by training the neural network to generate output node values approximating the corresponding output vector in response to receiving the input vector (act 406). For example, training module 233 can use a back propagation algorithm to train untrained neural network 234U to recognize assigned symbol 232. Training module 233 can do so by training untrained neural network 234U to generate values at output nodes 253 that approximate desired output vector 239 to within a specified threshold.

Comparison module 244 can compare actual output vector 241 to desired output vector 244. If the values of actual output vector 241 are not within the specified threshold of the values of desired output vector 239, comparison module 244 can feed link adjust values 242 (i.e., the error) back into untrained neural network 234U. Comparison module 244 can perform one or more iterations of feeding link adjustment values 242 into untrained neural network 234U until values of actual output vector 241 are within the specified threshold of the values of desired output vector 239. When output values are within the threshold, comparison module 244 can indicate training module 233 that untrained neural network 234U is trained to recognize assigned symbol 232 from input gesture data 231. For example, trained neural network 234T can output values for actual output vector 243 that are within the specified threshold of values for desired output vector 239.

Similar to differences in handwriting amongst different people, different computer users can also enter varied input gestures that are meant to be the same symbol. Thus, in some embodiments, a plurality of examples input gestures representing an assigned symbol are utilized. For example, additional example input gestures designated to be the '^' symbol can be provided to training module 233.

Input gesture data can be created and accessed for each example input gesture. From each input gesture data, a corresponding training input vector can be encoded. Each training input vector can be included in a training set that is to cause a neural network to output the same desired output vector (that maps to the assigned symbol). Thus, a neural network can be trained to recognize various input gestures having different variations as the same assigned symbol. Using a plurality of input vectors increases the likelihood of a trained neural network appropriately identifying a subsequently entered input gesture as the assigned symbol.

Further, embodiments of the invention also include training a neural network to recognize a plurality of different assigned symbols. For example, a neural network can be trained to recognize each character in an alphabet (e.g., Latin, Cyrillic, Arabic, Brahmic-derived, Hebrew, Hangul, etc.) or each different symbol in other symbol sets that can be used for communication (e.g., Chinese logograms or Japanese syllabary). A neural network can also be trained to recognize each number in a numeral system (e.g., Arabic derivatives, Roman, Chinese, Japanese, Korean, etc.). A neural network can also be trained to recognize different combinations of symbols including characters (or logograms, syllabary, etc.) and numbers. For example, a neural network can be trained to recognize all the symbols in a specified character set (e.g., Unicode, ASCII, EBCDIC, ISO-8859 character sets, ANSI, Microsoft® Windows® character sets, Shift JIS, EUC-KR, etc).

Accordingly, one or more examples of input gestures representing each symbol in an alphabet, numeral system, character set, etc., or combination thereof can be utilized. For example, a plurality of input gestures designated for each symbol (letter) in the Latin alphabet (e.g., a, b, c, d, etc.) can be provided to training module 233. For each assigned symbol, input gesture data can be created and accessed for each example input gesture representing the assigned symbol. From each input gesture data for an assigned symbol, a corresponding training input vector can be encoded. Each training input vector for an assigned symbol can be associated with the same desired output vector (that maps to the assigned symbol).

Thus, one or more sets (a set for each assigned symbol) including a plurality of training input vectors and corresponding desired output vector can be created. Each of the one or more sets can be included in a training set that is to cause a neural network to output appropriate desired output vectors (that map to appropriate assigned symbols). Thus, a neural network can be trained to recognize each symbol in a set of symbols even though computer users may enter varied input gestures that are meant to represent each of the symbols.

Neural networks can also be trained to recognize user-defined symbols.

Figure 3:
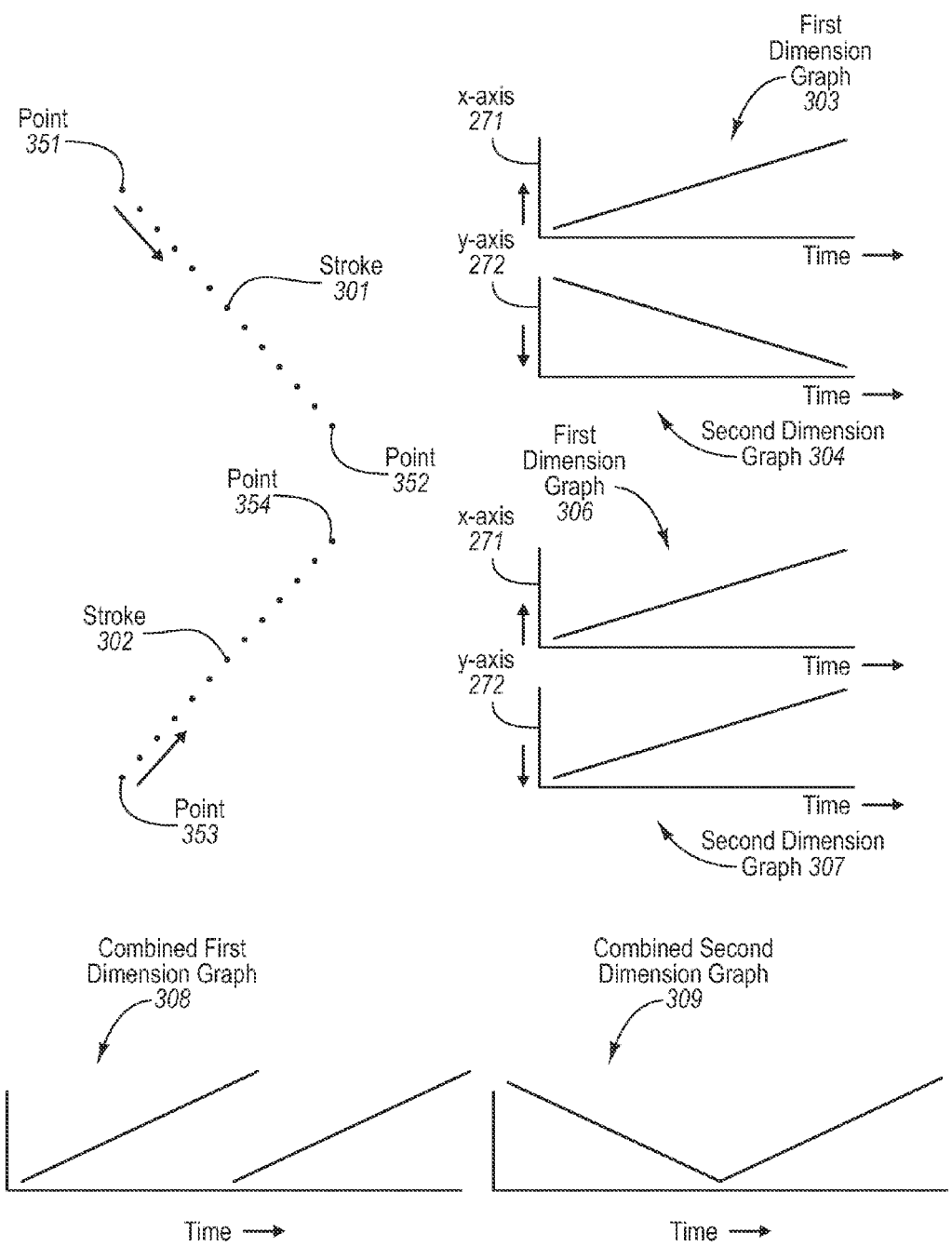
FIG. 3 illustrates an example of input gesture data and combined graphs for a multi-stroke symbol that can be used to create a corresponding input vector.

Accordingly, embodiments of the invention include training a neural network to recognize multi-stroke symbols. Referring now to FIG. 3, FIG. 3 depicts a graphical representation of input gesture data for an 'x'. Stroke 301 represents that contact was detected between point 351 and point 352. Subsequently, a period of no contact was detected.

For stroke 301, training module 233 can calculate first dimension graph 303. First dimension graph 303 indicates the location of detected contact of the corresponding input gesture relative to X-axis 271 over time. Based on the graphical representation, training module 233 can also calculate second dimension graph 304. Second dimension graph 304 indicates the location of detected contact of the corresponding input gesture relative to Y-axis 272 over time.

After the period of no contact, stroke 302 represents contact was detected between point 353 and point 354. For stroke 302, training module 233 can calculate first dimension graph 306. First dimension graph 306 indicates the location of detected contact of the corresponding input gesture relative to X-axis 271 over time. Based on the graphical representation, training module 233 can also calculate second dimension graph 307. Second dimension graph 307 indicates the location of detected contact of the corresponding input gesture relative to Y-axis 272 over time.

Subsequently, a second (potentially longer) period of no contact can be detected indicating that the corresponding input gesture is complete. In response, training module 233 can combine first dimension graph 303 and first dimension graph 306 into combined first dimension graph 308. Combined first dimension graph 308 represents the collective contact for the corresponding input gesture relative to X-axis 271. Similarly, training module 233 can combine second dimension graph 304 and second dimension graph 307 into combined second dimension graph 309. Combined second dimension graph 309 represents the collective contact for the corresponding input gesture relative to Y-axis.

When additional strokes are included (e.g., East Asian characters) further individual graphs can be created on a per stroke basis. Any number of individual graphs (e.g., one per stroke) can be combined per axis. Accordingly, the collective contact data (relative to each axis) for an input gesture can be graphed even when a corresponding input gesture does not include continuous contact with multi-touch input display 202.

Training module 233 can then sample the value of each of combined first dimension graph 308 and combined second dimension graph 309 at a plurality of designated times. From the sample values, training module 233 can encode a training input vector 239 of real values. Training module can then save an indication that providing the real values of the training input vector as input to a neural network is to cause the neural network to output a desired output vector corresponding to the letter 'x'. Training module 233 can then provide the input vector and desired output vector to a neural network. Using a back propagation algorithm, the neural network can be trained to recognize the desired output vector (and thus the letter 'x') from the training input vector.

When multiple strokes are input in close spatial proximity to or intersect with one another (e.g., an 'x' or 'ê') there is an increased likelihood the strokes correspond to the same input gesture. On the other hand, when multiple strokes are not input in close spatial proximity to one another (e.g., '/' followed by '\' or 'e' followed by '~'), there is a decreased likelihood the strokes correspond to the same input gesture. A requisite proximity distance between strokes can be used to determine the sufficiency of a spatial relationship between two or more strokes and thus if the two or more strokes correspond to the same input gesture. The requisite proximity distance can be, for example, some number of centimeters, millimeters, pixels, etc., on multi-touch input display surface 202.

Generally training module 233 or vector generator 259 can verify a sufficient spatial relationship between multiple strokes before determining that the multiple strokes correspond to the same input gesture. For example, when two strokes are separated by a distance less than or equal to a requisite proximity distance, training module 233 or vector generator 259 can determine that the two strokes correspond to the same input gesture. On the other hand, when two strokes are separated by a distance greater than the requisite proximity distance, training module 233 or vector generator 259 determine that the two strokes do not correspond to the same input gesture.

In some embodiments, a bounding box is used to determine the sufficiency of a spatial relationship between two or more strokes. A bounding box of specified dimensions is positioned around each of a plurality of strokes. When the bounding boxes corresponding to different strokes intersect, training module 233 or vector generator 259 can determine that the two strokes correspond to the same input gesture. On the other hand, when the bounding boxes corresponding to different strokes do not intersect, training module 233 or vector generator 259 can determine that the two strokes do not correspond to the same input gesture.

Alternately, bounding boxes can be used in combination with a requisite proximity distance to determine the sufficiency of a spatial relationship between two or more strokes. When the bounding boxes corresponding to different strokes are separated by a distance less than or equal to a requisite proximity distance, training module 233 or vector generator 259 can determine that the two strokes correspond to the same input gesture. On the other hand, when the bounding boxes corresponding to different strokes are separated by a distance greater than the requisite proximity distance, training module 233 or vector generator 259 determines that the two strokes do not correspond to the same input gesture.

The use of spatial proximity permits multiple users to simultaneously utilize multi-touch input display surface 202 to enter input gestures to train for recognition of and recognize symbols without interfering with one another.

Similarly, when multiple strokes are input in close temporal proximity to another there is an increased likelihood the strokes correspond to the same input gesture. On the other hand, when multiple strokes are not input in close temporal proximity to one another there is a decreased likelihood the strokes correspond to the same input gesture. A requisite time interval between strokes can be used to determine if multiple strokes correspond to the same input gesture. The requisite time interval can be, for example, some number of milliseconds, such as, between 50 ms and 1000 ms. In some embodiments, 400 ms is used as the requisite time interval.

Generally training module 233 or vector generator 259 can verify a sufficient temporal relationship between multiple strokes before determining that the multiple strokes correspond to the same input gesture. For example, when the time interval between the input of a first stroke and the input of a second stroke is less than or equal to the requisite time interval, training module 233 or vector generator 259 can determine that the first stroke and the second stroke correspond to the same input gesture. On the other hand, when the time interval between the input of a first stroke and the input of a second stroke is greater than or equal to the requisite time interval, training module 233 or vector generator 259 determine that the first stroke and the second stroke do not correspond to the same input gesture.

Subsequent to training a neural network, the neural network can then be used to recognize input gestures as corresponding assigned symbols. Referring now to FIG. 2D, vector generator 259 can be configure to generate an input vector from receiving input gesture data. Vector generator 259 can generate an input vector in a manner similar to (and may be a subcomponent of) training module 233. For example, vector generator 259 can graph contact relative to X-axis 271 and Y-axis 272. Vector generator can then take samples of the graphs at a plurality of time intervals over a time period an input gesture was entered.

Trained neural network 234T is confined to receive an input vector and generate a corresponding output vector. Recognition module 266 is configured to receiving an output vector and refer to output vector/assigned symbol mapping 262 to identified an appropriate assigned symbol. Recognition module 266 can send the assigned symbol to graphical subsystem 269 for presentation on multi-touch input display surface 202.

Figure 5:
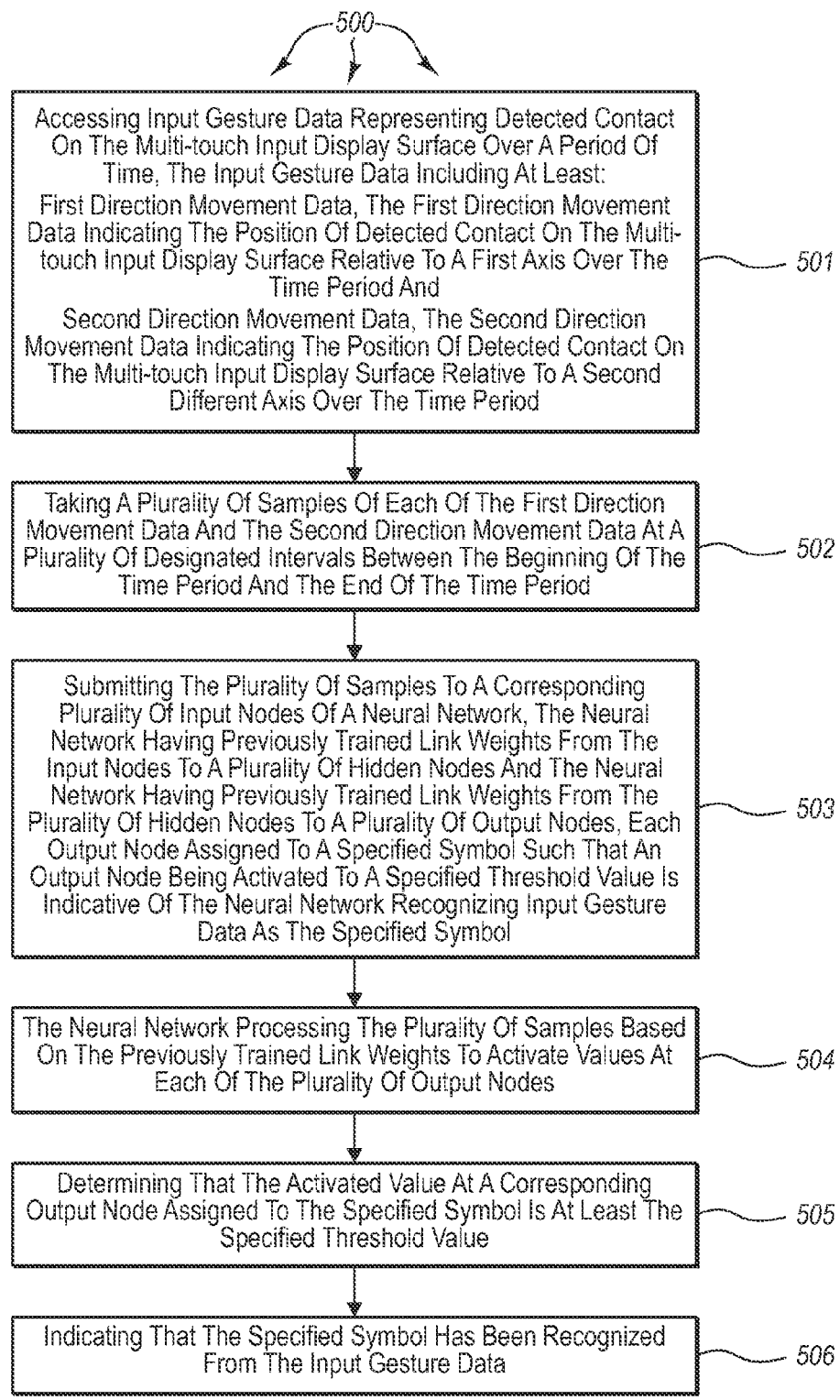
FIG. 5 illustrates a flow chart of an example method for recognizing a specified input pattern.

FIG. 5 illustrates a flow chart of an example method 500 for recognizing a specified input pattern. Method 500 will be described with respect to the components and data in FIGS. 2C and 2D.

Method 500 includes an act of accessing input gesture data representing detected contact on a multi-touch input display surface over a period of time (act 501). The input gesture data includes first direction movement data and second direction movement data. The first direction movement data indicates the position of detected contact on the multi-touch input display surface relative to a first axis over the time period. The second direction movement data indicates the position of detected contact on the multi-touch input display surface relative to a second different axis over the time period.

For example, it may be that the index finger of hand 257 contacts multi-touch input display surface 202 within input region 221 to enter input gesture 256. Sensors 103 can track contact (in an essentially straight line) from point 284 to point 285. Sensors 103 can then track contact (in essentially a straight line) from point 285 to point 286. As contact is moved from point to point on multi-touch surface 202, sensors 203 and sensor interface 213 can interoperate to track and buffer representative sensor signal data relative to X-axis 271 and Y-axis 272

After reaching point 286, the index finger of hand 257 can be lifted off of multi-touch input display surface 202. Accordingly, sensors 203 no longer detect contact on multi-touch input display surface 202. In response, sensor interface 213 can convert the representative sensor signal data to input gesture data 258. Input gesture data 258 represents detected contact over the period of time input gesture 256 was entered. Input gesture data 258 indicates the position of detected contact for input gesture 256 over the time period relative to X-axis 271 and Y-axis 272. Point 284 (the initial point of contact) can be used as the origin.

Sensor interface 213 can send input gesture data 258 to vector generator 259. Vector generator 259 can receive input gesture data 258 from sensor interface 213.

Method 500 includes an act of taking a plurality of samples of each of the first direction movement data and the second direction movement data at a plurality of designated intervals between the beginning of the time period and the end of the time period (act 502). For example, vector generator 259 can create a dimension graph for movement relative to X-axis 271 and a dimension graph for movement relative to Y-axis 272 over time. Vector generator 259 can sample the value of each of dimension graphs at a plurality of designated times. From the sample values, vector generator 259 can encode input vector 261 of real values. Vector generator 259 can sample received input gesture data similar to training module 233 (e.g., taking the same number of samples and taking samples at the same time intervals). Thus, input vectors generated by vector generator 209 are compatibly received at neural networks trained by training module 233.

Method 500 includes an act of submitting the plurality of samples to a corresponding plurality of input nodes of a neural network (act 503). The neural network has previously trained link weights from the input nodes to a plurality of hidden nodes and has previously trained link weights from the plurality of hidden nodes to a plurality of output node. Each output node is assigned to a specified symbol such that an output node being activated to a specified threshold value is indicative of the neural network recognizing input gesture data as the specified symbol.

For example, vector generator 259 can submit input vector 261 to trained neural network 234T. Training module 233 previously trained the link weights between input nodes 251 and hidden nodes 252 and previously trained the link weights between hidden nodes 252 and output nodes 253. Each of the output nodes 253 is assigned to a specified symbol. Thus, when one of the output nodes 253 is activated to within a specified threshold value, the input gesture data 258 is recognized as assigned symbol 232.

Method 500 includes an act of the neural network processing the plurality of samples based on the previously trained link weights to activate values at each of the plurality of output nodes (act 504). For example, trained neural network 234T can process input vector 261 based on trained link values 246T and 247T to active values at each of output nodes 253 (thus resulting in output vector 264). Method 500 includes an act of determining that the activated value at the specified output node assigned to the specified symbol is at least the specified threshold value (act 505). For example, recognition module can compare output vector 264 to one more desired output vectors in output vector/assigned symbol mapping 262. When an activated value in output vector 264 is within a specific threshold of an activated value for a desired output vector, recognition module 266 recognizes output vector 264 and the desired output vector as a match. For example, recognition module 266 can recognize output vector 264 and desired output vector 239 as a match.

Method 500 includes an act of indicating that the specified symbol has been recognized from the input gesture data (act 506). For example, recognition module 266 can determine that desired output vector 239 maps to assigned symbol 232. Recognition module can send assigned symbol 232 to graphical subsystem 269. Graphical subsystem can then present assigned symbol in input region 221 at or near where input gesture 256 was entered.

Embodiments of the invention include recognizing any symbol a neural network can be trained to recognize. Thus, assigned symbol 232 can be one of a plurality of recognizable symbols (including multi-stroke symbols) trained neural network 234T has been trained to recognize.

Embodiments of the invention can also track contact data for an input gesture additional dimensions. For example, when sensors 203 are configured to detect pressure, contact data can be tracked along a Z-axis (and thus in three dimensions) for pressure. Other types of sensors, such as, for example, height sensors, can used to track finger movements above the table. These other sensors can be used to track finger movements relative to a Z-axis for height.

Thus, a dimensional graph of contact data relative to a Z-axis over time can be created. Samples of the Z-axis dimensional graph can be taken along with samples in X and Y dimensions. Based on Z-dimension measurements different gestures can be recognized. For example, a gesture drawn more firmly and the same gesture drawn more lightly can be trained or recognized as different gestures. Alternately, different movements above multi-touch input display surface 202 can indicate different gestures even if contact on multi-touch input display surface 202 is the same for the gestures.

Embodiments of the invention can also compensate for input gestures entered at arbitrary rotations. To compensate for rotation, a module (e.g., training module 233 or vector generator 259) determines the initial direction of contact movement (e.g., referring to FIG. 2A, from point 281 to point 282). An initial direction can be computed in accordance with the following pseudo-code example:

1. Create a set S of points, initially empty
2. From gesture G, create a bounding square, which completely bounds the points in G, is centered around G, and is a square shape (sides are of equal length). The bounding square has sides of B length.
3. Keep adding points from gesture G to S until
   A. The x displacement of the points is 33% of B; or
   B. The y displacement of the points is 33% of B 4. Fit a line through the points in S (e.g. Using the least squares method):

Once "initial direction" line, is computed, the entire gesture is rotated so that the initial direction line is going horizontally, from left to right. The rotation can be done as follows:

5. Compute the angle theta of the initial direction line, from the horizontal line going left to right. Theta is >=0 and <360 degrees.

6. Rotate all points by Theta degrees, using a standard rotation matrix.

From the normalized (rotated) input gesture data, X vs T and Y vs T graphs can be created and sampled. The sampled values can then be passed to the neural network. Compensation for rotation can be performed any time a gesture is given as a training sample, or when we are recognizing a gesture drawn by a user. The "initial direction" can be used to normalize all inputs, so that a standard, single orientation is always presented to the neural network. For multi stroke gestures, an initial direction can be computed the same way, based on the concatenated input graphs. Alternately for multi stroke gestures, an initial direction can be computed based on the first stroke only.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a multi-touch input display surface, a method for training the computer system to recognize input gesture data entered at the multi-touch input display surface as a corresponding specified input pattern, the method comprising:
    an act of accessing input gesture data for at least one example of a specified input pattern, the input gesture data representing detected contact on the multi-touch input display surface over a period of time, the input gesture data including for at least the one example of the specified input pattern:
        first direction movement data, the first direction movement data being a first calculated graph including a directional axis corresponding to a first axis and a time axis corresponding to the period of time contact was detected on the multi-touch input display surface, the first calculated graph indicating the position of detected contact on the multi-touch input display surface relative to the first axis over the time period; and
        second direction movement data, the second direction movement data being a second calculated graph including a directional axis corresponding to a second axis and a time axis corresponding to the period of time contact was detected on the multi-touch input display surface, the second calculated graph indicating the position of detected contact on the multi-touch input display surface relative to a second different axis over the time period;
    an act of encoding the input gesture data into an input vector of real values, each real value corresponding to a sample taken from the first or second axis, each real value corresponding to a time value from the period of time contact was detected on the multi-touch input display surface and including a directional axis value;
    an act of saving an indication that the real values contained in the input vector represent an example of the specified input pattern;
    an act of accessing a fully connected neural network, the neural network including input nodes, hidden nodes, and output nodes, the input nodes being fully connected to the hidden nodes and the hidden nodes being fully connected to the output nodes;
    an act of creating a training set to supply to the neural network to train the neural network to recognize the specified input pattern, the training set including at least the input vector and a corresponding output vector, the corresponding output vector indicating the desired output of the neural network that is to correspond to the specified input pattern; and
    an act of using a back propagation algorithm to train the neural network to recognize the specified pattern of input by training the neural network to generate output node values approximating the corresponding output vector in response to receiving the input vector.

2. The method as recited in claim 1, wherein the act of accessing input gesture data for at least one example of a specified input pattern comprises an act of access input gesture data for a plurality of examples of the specified input pattern.

3. The method as recited in claim 1, wherein the act of accessing input gesture data for at least one example of a specified input pattern comprises an act of accessing input gesture data for one example of each of a plurality of different specified input patterns.

4. The method as recited in claim 1, wherein the act of accessing input gesture data for at least one example of a specified input pattern comprises an act of accessing input gesture data for a plurality of examples of each of a plurality of different specified input patterns.

5. The method as recited in claim 1, wherein the act of accessing input gesture data comprises an act of accessing input gesture data for a multi-stroke input pattern.

6. The method as recited in claim 1, further comprising an act of compensating for the rotation of an input gesture from which the input gesture data was created prior to encoding the input gesture data in an input vector of real values.

7. The method as recited in claim 1, wherein the input gesture data also includes third direction movement data, the third direction movement data representing movement along an arbitrary additional third axis over the time period.

8. The method as recited in claim 1, wherein the act of encoding the input gesture data into an input vector of real values comprises taking a plurality of samples of each of the first direction movement data and the second direction movement data at a plurality of designated intervals between the beginning of the time period and the end of the time period.

9. The method as recited in claim 8, wherein using a back propagation algorithm to train the neural network to recognize the specified pattern of input comprises:
    an act of submitting the plurality of samples to a corresponding plurality of input nodes of the neural network, the neural network having random link weights assigned from the input nodes to a plurality of hidden nodes and the neural network having random link weights assigned from the plurality of hidden nodes to a plurality of output nodes;
    an act of indicating to the neural network that the input gesture data is to cause the neural network to activate a specified output node to at least a specified threshold value, the specified output node assigned, from among the plurality of output nodes, for the specified symbol;

an act of the neural network processing the plurality of samples based on the random link weights to activate values at each of the plurality of output nodes;

an act of determining that the activated value at the specified output node is not at least the specified threshold value;

an act of calculating an error value indicating the difference between the activated value at the specified output node and the specified threshold value; and an act of propagating the error value backwards from the plurality of output nodes into the neural network to adjust link weights within the neural network, the adjusted link weights causing the neural network to activate the specified output node closer to the specified threshold value when subsequently processing the plurality of samples.

10. The method as recited in claim 9, further comprising subsequent to propagating the error value backwards from the plurality of output nodes into the neural network:

an act of re-submitting the plurality of samples to the corresponding plurality of input nodes of the neural network; and an act of the neural network processing the plurality of samples based on the adjusted link weights to activate second values at each of the plurality of output nodes.

11. The method as recited in 10, further comprising:

an act of continuing to calculate further error values and propagate the further error values backwards from the plurality of output nodes into the neural network to further adjust link weights within the neural network until adjusted link weights result in a specified output node value that is least the specified threshold value; and an act of, upon detecting that the specified output node value is at least the specified threshold value, indicating that the neural network is trained to recognize the specified symbol.

12. The method as recited in claim 1, wherein the act of saving an indication that the real values contained in the input vector represent an example of the specified input pattern comprise an act of saving an indication that the real values contained in the input vector represent an example of a user-defined input pattern.

13. The method as recited in claim 1, wherein the act of saving an indication that the real values contained in the input vector represent an example of the specified input pattern comprise an act of saving an indication that the real values contained in the input vector represent an example of a input pattern from among a plurality of input patterns in an alphabet.

14. At a computer system including a multi-touch input display surface, a method for recognizing input gesture data entered at the multi-touch input display surface as a specified symbol, the method comprising:

an act of accessing input gesture data representing detected contact on the multi-touch input display surface over a period of time, the input gesture data including at least:

first direction movement data, the first direction movement data being a first calculated graph including a directional axis corresponding to a first axis and a time axis corresponding to the period of time contact was detected on the multi-touch input display surface, the first calculated graph indicating the position of detected contact on the multi-touch input display surface relative to the first axis over the time period; and second direction movement data, the second direction movement data being a second calculated graph including a directional axis corresponding to a second axis and a time axis corresponding to the period of time contact was detected on the multi-touch input display surface, the second calculated graph indicating the position of detected contact on the multi-touch input display surface relative to a second different axis over the time period;

an act of taking a plurality of samples of each of the first direction movement data and the second direction movement data at a plurality of designated intervals between the beginning of the time period and the end of the time period;

an act of submitting the plurality of samples, including submitting real values, each real value corresponding to a time value from the period of time contact was detected on the multi-touch input display surface and including a directional axis value, to a corresponding plurality of input nodes of a neural network, the neural network having previously trained link weights from the input nodes to a plurality of hidden nodes and the neural network having previously trained link weights from the plurality of hidden nodes to a plurality of output nodes, each output node assigned to a specified symbol such that an output node being activated to a specified threshold value is indicative of the neural network recognizing input gesture data as the specified symbol;

an act of the neural network processing the plurality of samples based on the previously trained link weights to activate values at each of the plurality of output nodes;

an act of determining that the activated value at the specified output node assigned to the specified symbol is at least the specified threshold value; and an act of indicating that the specified symbol has been recognized from the input gesture data.

15. The method as recited in claim 14, further comprising compensating for the rotation of the input gesture from which the input gesture data was created prior to taking the plurality of samples.

16. The method as recited in claim 14, wherein the act of submitting the plurality of samples to a corresponding plurality of input nodes of a neural network comprises an act of submitting the plurality of samples to a neural network that was trained to recognize characters of a specified alphabet.

17. The method as recited in claim 14, wherein the input gesture data also includes third direction movement data, the third direction movement data representing movement along a third axis over the time period.

18. The method as recited in claim 14, wherein the act of accessing input gesture data comprises an act of accessing input gesture data for a multi-stroke input gesture.

19. The method as recited in claim 14, further comprising an act of presenting the specified symbol on the multi-touch input display surface.

20. A computer program product for use at a computer system including a multi-touch input display surface, the computer program product form implementing a method for training the computer system to recognize input gesture data entered at the multi-touch input display surface as a corresponding specified input pattern, the computer program product comprising one or more computer-readable physical storage media having stored thereon computer-executable instructions that, when executed at a processor, cause the computer system to perform the method, including performing the following:

access input gesture data for at least one example of a specified input pattern, the input gesture data representing detected contact on the multi-touch input display surface over a period of time, the input gesture data including for at least the one example of the specified input pattern:
- first direction movement data, the first direction movement data being a first calculated graph including a directional axis corresponding to a first axis and a time axis corresponding to the period of time contact was detected on the multi-touch input display surface, the first calculated graph indicating the position of detected contact on the multi-touch input display surface relative to the first axis over the time period; and
- second direction movement data, the second direction movement data being a second calculated graph including a directional axis corresponding to a second axis and a time axis corresponding to the period of time contact was detected on the multi-touch input display surface, the second calculated graph indicating the position of detected contact on the multi-touch input display surface relative to a second different axis over the time period;

encode the input gesture data into an input vector of real values, each real value corresponding to a sample taken from the first or second axis, each real value corresponding to a time value from the period of time contact was detected on the multi-touch input display surface and including a directional axis value;

save an indication that the real values contained in the input vector represent an example of the specified input pattern;

access a fully connected neural network, the neural network including input nodes, hidden nodes, and output nodes, the input nodes being fully connected to the hidden nodes and the hidden nodes being fully connected to the output nodes;

create a training set to supply to the neural network to train the neural network to recognize the specified input pattern, the training set including at least the input vector and a corresponding output vector, the corresponding output vector indicating the desired output of the neural network that is to correspond to the specified input pattern; and use a back propagation algorithm to train the neural network to recognize the specified pattern of input by training the neural network to generate output node values approximating the corresponding output vector in response to receiving the input vector.

* * * * *